United States Patent [19]
Alonso et al.

[11] Patent Number: 5,191,940
[45] Date of Patent: Mar. 9, 1993

[54] OIL/GAS SEPARATOR FOR INSTALLATION AT BURNING WELLS

[75] Inventors: Carol T. Alonso, Orinda; Donald A. Bender, Dublin; Barry R. Bowman; Alan K. Burnham, both of Livermore; Dwayne A. Chesnut, Pleasanton; William J. Comfort, III, Livermore; Lloyd G. Guymon, Livermore; Carl D. Henning, Livermore; Knud B. Pedersen, Livermore; Joseph A. Sefcik, Tracy; Joseph A. Smith; Mark S. Strauch, both of Livermore, all of Calif.

[73] Assignee: The United States of America as represented by the United States Department of Energy, Washington, D.C.

[21] Appl. No.: 748,586

[22] Filed: Aug. 22, 1991

[51] Int. Cl.⁵ ............................................. A62C 3/00
[52] U.S. Cl. ........................................ 169/69; 166/79; 55/159; 55/385.1
[58] Field of Search ................. 55/159, 462, 464, 465, 55/385.1; 169/69; 166/79, 96, 267

[56] References Cited

U.S. PATENT DOCUMENTS

| | | | |
|---|---|---|---|
| 154,125 | 8/1874 | Conrow | 55/462 |
| 422,202 | 2/1890 | Furney | 55/464 |
| 505,085 | 9/1893 | Baum | 55/464 |
| 1,405,259 | 1/1922 | Beach | 55/464 |
| 1,520,288 | 12/1924 | Featherstone | 169/69 |
| 1,787,927 | 1/1931 | Bullard | 169/69 |
| 1,859,606 | 5/1932 | Sievern et al. | 169/69 |
| 4,323,118 | 4/1982 | Bergmann | 169/69 |
| 5,131,474 | 7/1992 | Hunter | 169/69 |

Primary Examiner—Bernard Nozick
Attorney, Agent, or Firm—Henry P. Sartorio; Roger S. Gaither; Willaim R. Moser

[57] ABSTRACT

An oil/gas separator is disclosed that can be utilized to return the burning wells in Kuwait to production. Advantageously, a crane is used to install the separator at a safe distance from the well. The gas from the well is burned off at the site, and the oil is immediately pumped into Kuwait's oil gathering system. Diverters inside the separator prevent the oil jet coming out of the well from reaching the top vents where the gas is burned. The oil falls back down, and is pumped from an annular oil catcher at the bottom of the separator, or from the concrete cellar surrounding the well.

20 Claims, 2 Drawing Sheets

OIL/GAS SEPARATOR FOR INSTALLATION AT BURNING WELLS

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to methods of controlling oil fires at a burning wellhead. In particular, the present invention relates to a method and device for separating the oil from the gas at an oil fire.

One of the consequences of the war in the Middle East is that there are now hundreds of oil fires burning in Kuwait. Some estimates say that the amount of oil wasted in Kuwait every day is one third the daily consumption of the entire United States. Most of the wellhead control valves have been destroyed, and some wells are now gushing at about 10,000 barrels a day. This is more than twice as much as the usual 3,000–4,000 barrels produced per day during normal production. Burning oil and accompanying gases are spewing out up to 500,000 tons of pollution every week, blackening the sky and creating an environmental catastrophe that will likely have global consequences. Wasted oil is rapidly covering large areas of land. There is 100 million dollars a day of lost revenue, which could result in dire economic consequences. In short, this is a very serious problem.

The current pace of extinguishing the well fires is much too slow. Methods now in use involve spraying water on the fire for up to several weeks in attempts to cool it down in hopes that it will not reignite when explosives are employed to blow the fire out. If the exposives are successful, an attempt is made to install a valve on the wellhead. In the meantime oil flows all over the neighboring sand. All of this is very time consuming, and so far it has only been effective in extinguishing some of the fires.

There therefore exists an urgent need for a more rapid way to control all of the oil fires, and return the oil to useful production.

SUMMARY OF THE INVENTION

It is an object of the present invention to provide an economical method and apparatus for rapidly bringing the oil fires in Kuwait or elsewhere under control.

It is a further object of the present invention to provide a method and apparatus for separating the gas and oil coming from the wells, and pumping the oil into oil gathering system.

These, and other objects of the invention are realized by providing a gas/oil separator which is placed over a burning well with a crane. The separator base plate is large enough to allow a skirt around its periphery to fit around the well's concrete cellar. The weight of the separator causes the skirt to penetrate several inches into the ground to form a seal around the well.

The seal prevents gas from escaping at the separator base. The velocity and pressure of the gas decrease when the gas leaves the wellhead and enters the separator since it must now fill up a larger volume. The slower moving gas may then be burned at the top vents on the roof of the separator.

Burning oil and gas from the damaged well enters the bottom of the separator as it is lowered over the well. The fire quickly consumes the available oxygen in the separator tank, and subsequently continues to burn off at the top vents on the separator roof. If desired, the flame may be extinguished, and the gas may be compressed for later use.

A flow diverter and splash plate are located in the path of the oil jet to prevent the oil from reaching the top vents. The flow diverter is shaped to deflect the oil towards the wall of the separator tank away from the oil jet, while the splash plate is flat. Oil then falls into an annular oil catcher at the bottom of the separator tank, or some of it falls into the concrete cellar around the well. The accompanying gas that is flowing upwards inside the separator tank no longer has enough velocity to carry the oil upwards.

Separate pumps are provided for independently pumping the oil from the well's cellar and the separator's annular oil catcher an oil distribution system. The pumps are self-priming, and should be running when the separator is lowered into place. They have more than enough pumping capacity to handle all of the oil coming out of the well.

Safety concerns require checking for mines, and the like, at the work area prior to lowering the separator over the well. An air, water, or steam hose on the front of the (shielded) crane boom may be used to blow away sand, and expose any buried mines. The same hose is also used to clear sand buildup from the well's cellar, so that it provides a suitable tank from which to pump oil. (This is not mandatory since industrial pumps presently available will also handle a fair amount of sand.)

The details of the invention are explained more fully in the following description with reference to the drawings.

DETAILED DESCRIPTION OF THE INVENTION

One of the most important features of the present invention is that it provides a means for bringing oil fires under control at a safe distance. The entire operation is conducted with a crane. For instance, an Athey wagon is a suitable crane that can easily carry 30,000 pounds on a 60' boom. Well preparation is greatly facilitated since the crane operator remains at a safe distance from the well at all times. The preparation consists primarily of clearing sand out of the concrete cellar around the well with a high pressure air, water, or steam hose attached to the end of the crane boom. Any mines remaining in the work area may be exposed using the same hose. After the site is prepared, the separator is attached to the crane with a releasable bracket and lowered onto the well.

Figure 1:
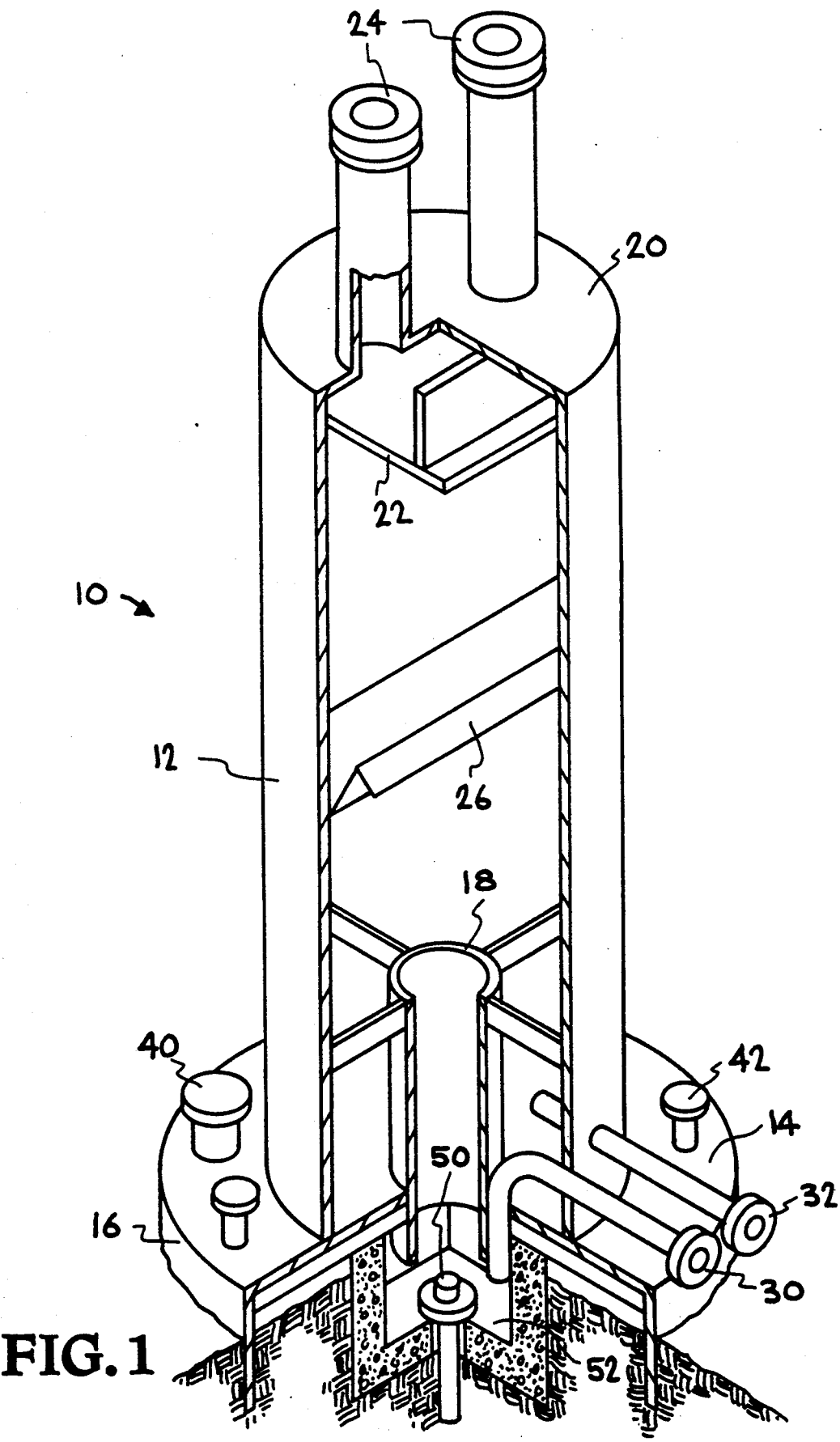
FIG. 1 shows a cutaway cross section of an oil/gas separator according to the present invention.
Figure 2:
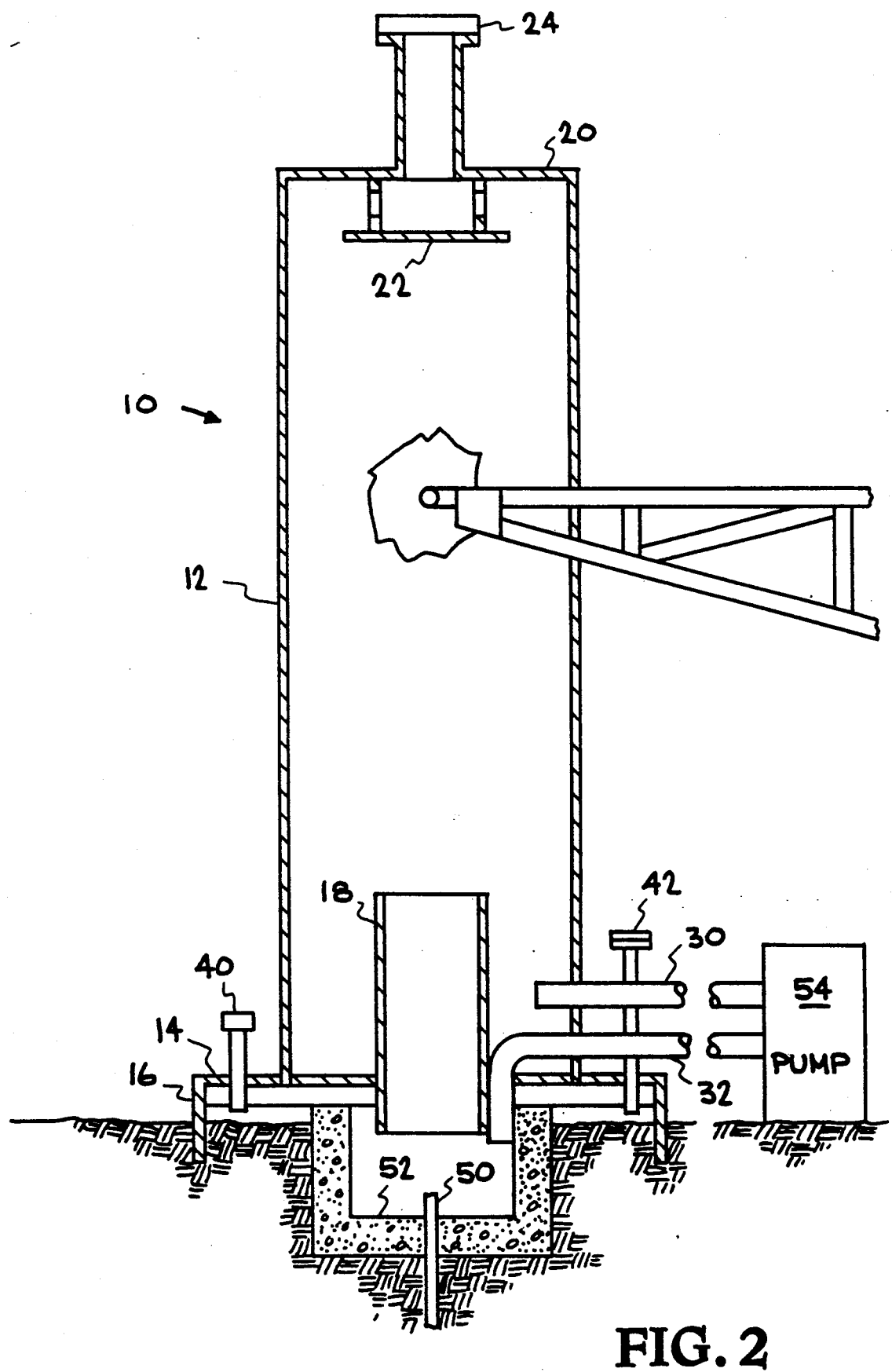
FIG. 2 shows a slightly different cutaway cross section of an oil/gas separator according to the present invention.

In a preferred embodiment oil/gas separator 10 comprises steel tank 12 that is 8' in diameter and 25'-4" high, as shown in FIGS. 1 and 2. Tank 12 includes base plate 14 with skirt 16 formed around its periphery. Inner cylinder 18, the bottom side of tank 12, and base plate 14 form an annular oil catcher around the inner bottom of tank 12. Roof 20 has a replaceable 4'×6' splash plate 22 attached to its bottom. The openings at the two ends of splash plate 22 allow gas, but not oil, access to top vents 24.

A 3' wide flow diverter 26 is welded inside tank 12, and is shaped to divert the upwardly flowing oil towards the sides of tank 12. Flow diverter 26 is oriented vertically during transportation of tank 12 in a horizontal position to help prevent tank 12 from becoming bent during a bumpy truck ride. Flow diverter 26 advantageously located where the crane's boom attaches to separator 10 to add strength in that region during installation at the well site.

Roof 20, cylinder 18, flow diverter 26, and base 14 are all preferably ¼ inch thick. Tank 12 is ¼ inch thick. Splash plate 22 is 1 inch thick. All are made of steel.

As separator 10 is lowered over the burning well the flame uses up the oxygen inside tank 12. The internal flame is extinguished, but the gas continues to burn off at top vents 24. Vents 24 may be non-smokeless utility flares, or they may have a smokeless air blower flare system. Both have 16 inch diameters, and are equipped with one-way flaps to prevent any air backflow that could cause reignition inside tank 12. Reigniters may also be placed on top vents 24 in case the flame extinguishes during installation.

When separator 10 is in place over well 50, ring-shaped skirt 16 penetrates partially into the soil around well cellar 52. This provides a seal that withstands 5 psi in unpacked oil-soaked sand, and 1 psi in dry sand. Gas leaks are prevented since separator 10 is designed to operate with a gas pressure of ¼ psi. (Sand may also be pushed against skirt 16 to form a seal if an obstruction prevents separator 10 from sitting flat.)

Oil does not reach top vents 24 because flow diverter 26 and splash plate 22 stop the oil jet coming out of well 50. Advantageously, separator 10 still functions if diverter 26 wears through or breaks. Diverter 26 preferably has a "gull wing" shaped cross section. This configuration deflects the oil jet towards the wall of tank 12, and is simple to manufacture. The oil then falls into the annular oil catcher around cylinder 18, or into cellar 52 through the hole in cylinder 18.

Pipes 30 and 32 are 6 inches in diameter and extend about 50' to self-priming pumps attached thereto and indicated generally at 54 that are operating when separator 10 is lowered onto well. Pipe 30 pumps the oil from cellar 52, and pipe 32 pumps oil from the annular catcher around cylinder 18. The pumps have the ability to pump several times the well's output, so tank 12 does not fill up with oil. The pumps are connected to the existing oil distribution network so the oil may be immediately utilized.

Base plate 14 also contains a 12 inch pressure relief port 40 that is set to release at ½ psi in case something causes the oil to build up inside tank 12. Relief port 40 may be connected to a pipe or hose for conveying the oil to the distribution network or a storage facility. Oil is then prevented from escaaping across skirt 16. Several sealing ports 42 may also be utilized to inject a polymer or cement into the sand for increasing the amount of pressure the seal across skirt 16 can withstand.

Oil/gas separator 10 of the present invention thus provides a unique temporary means for rapidly and economically bringing the oil fires in Kuwait under control, and returning the oil to production. Many variations on the present invention are possible. Note that the separator may be used with all wells that have no control valve, even if they are not on fire. The size, weight and configuration of the separator may all be varied for optimal performance at any given well. The flow diverter may have many different shapes, as may the splash plate. Many variations are possible. The full scope of the invention is only intended to be limited by the following claims.

We claim:

1. An oil/gas separator comprising: a metal vessel having a bottom and a top, with an opening in the bottom and at least one opening in the top;
   at least one metal obstruction in the interior of said vessel and secured to said vessel for blocking a projection of said bottom opening onto said at least one top opening;
   a metal tube secured in and extending upwards from said bottom opening and into said vessel to form an internal container within an inner periphery of a lower section of said vessel;
   means for sealing said vessel around a source of oil passing into said vessel;
   pumping means connected to said internal container of said vessel and to a region beneath said metal tube for pumping oil to an oil distribution system.

2. The separator of claim 1, wherein said sealing means comprises a metal skirt around an outside periphery of the bottom of said vessel and secured to said vessel, such that a bottom edge of said skirt is the lowest part of said separator.

3. The separator of claim 1 further comprising a pressure relief port connected to an extension of said bottom opening.

4. The separator of claim 1 further comprising a plurality of polymer or cement sealing ports connected to an extension of said bottom opening.

5. The apparatus of claim 1, further comprising means for passage of gas from said associated oil well through said vessel and out said opposite end of said vessel, and means for providing for burning or utilization of gas passing out from said vessel.

6. The separator of claim 1 wherein said at least one metal obstruction comprises a plurality of metal obstructions oriented vertically with respect to each other.

7. The separator of claim 6 wherein an uppermost metal obstruction comprises a plate connected to the top of said vessel, and; said uppermost metal obstruction completely blocks the projection of said bottom opening onto said at least one top opening.

8. The separator of claim 1 wherein said at least one metal obstruction is connected to an inner wall of said vessel, and; said metal obstruction extends across the interior of said vessel so as to completely block the projection of said bottom opening onto said at least one top opening.

9. The separator of claim 8 wherein said at least one top opening comprises a plurality of openings arranged in a line on said top of said vessel.

10. The separator of claim 8, wherein said metal obstruction has a gull wing shape.

11. An apparatus for extinguishing an oil well fire comprising:
    a longitudinally extending vessel closed at both ends except for at least one opening in each end thereof;
    a tube having a length less than a length of said vessel extending into said vessel and secured in an opening in one end of said vessel, an outer surface of said tube and an inner surface of said one end of said vessel defining therebetween an internal container within said vessel;

means located between one end of said tube and an opposite end of said vessel for obstructing direct passage of oil within said vessel between said openings at each end of said vessel;

means operatively connected to said one end of said vessel and adapted for sealing said one end of said vessel about an associated oil well;

means operatively connected to an opening in said opposite end of said vessel for preventing air flow into said vessel; and means connected to at least said internal container of said vessel for withdrawing oil therefrom;

whereby with said vessel positioned about an associated burning oil well and sealed at said one end thereof about such an associated oil well, flow of oil from such a well is obstructed from passing through said vessel, air is prevented from flowing into said vessel, such that combustion of oil flowing from such a well into said vessel is terminated, and oil flowing into said vessel is withdrawn therefrom.

12. The apparatus of claim 11, wherein said sealing means comprises a skirt secured to and extending in spaced relation about said one end of said vessel, one end of said skirt thereby extending beyond said vessel and being adapted to extend around an associated oil wellhead and form a seal with material surrounding said associated oil wellhead.

13. The apparatus of claim 11, wherein said means for obstructing direct passage between said openings at each end of said vessel comprises a pair of flow obstruction devices for obstructing the passage of oil, said devices being longitudinally spaced from each other.

14. The apparatus of claim 13, wherein one of said pair of flow obstruction devices comprises a splash plate secured to said opposite end of said vessel and in spaced relations to said opposite end, said splash plate having a length less than a cross section of said vessel to allow flow past at least one end of said splash plate.

15. The apparatus of claim 13, comprising as one of said pair of flow obstruction devices a flow diverter for diverting oil toward the inner surface of said vessel, said flow diverter being secured at opposite ends to inner wall surfaces of said vessel so as to extend across said vessel.

16. The apparatus of claim 15, wherein said flow diverter is constructed of a plurality of longitudinally extending members, each having a curved surface for deflecting oil flow at least onto said inner wall surfaces of said vessel.

17. A separator adapted to be positioned over a wellhead for separating oil from gas discharging from a wellhead, comprising:

a tank having a longitudinally extending body section, a top section, and a bottom section;

said bottom section comprising a base plate secured to said body section and extending outwardly from said body section, said base plate having an opening therein to provide flow into said tank;

said top section being operatively secured to said body section and having at least one opening therein to provide flow out of said tank;

a hollow member secured in said opening in said base plate and extending at least into said body section of said tank, thereby forming a container with at least a portion of said hollow member, a portion of said body section and a portion of said base plate located between said hollow member and said body section;

obstruction means positioned within said tank to prevent passage of at least oil from said tank;

means operatively connected to said tank for removing oil from said container within said tank; and means secured to said base plate for forming a seal about an associated wellhead on which said separator is positioned.

18. The separator of claim 17, wherein said tank is additionally provided with means mounted in at least one opening in said top section of said tank for at least burning gas flowing out of said tank.

19. The separator of claim 17, wherein said obstruction means comprises a splash plate and a flow diverter positioned within said tank in spaced relation;

said splash plate being secured to and spaced from said top section of said tank, and having a distance thereacross which is less than the distance across said body section of said tank, and mounted so as to obstruct passage of oil to an opening in said top section of said tank while allowing passage of gas to said opening in said top section;

said flow diverter comprising a plurality of members extending across said body section of said tank and secured to inner wall surfaces of said body section, said members being constructed so as to obstruct flow of oil while allowing passage of gas thereby.

20. The separator of claim 19, wherein at least one of said plurality of members forming said flow diverter has a curved surface constructed so as to direct oil striking said flow diverter toward said inner wall surfaces of said body section for collection in said container.

* * * * *